United States Patent
Alon et al.

(10) Patent No.: US 9,531,754 B2
(45) Date of Patent: Dec. 27, 2016

(54) METHODS, CIRCUITS, APPARATUS, SYSTEMS AND ASSOCIATED SOFTWARE APPLICATIONS FOR PROVIDING SECURITY ON ONE OR MORE SERVERS, INCLUDING VIRTUAL SERVERS

(75) Inventors: Zohar Alon, Tel Aviv (IL); Roy Feintuch, Tel Aviv (IL)

(73) Assignee: DOME 9 SECURITY LTD., Tel Aviv (IL)

( * ) Notice: Subject to any disclaimer, the term of this patent is extended or adjusted under 35 U.S.C. 154(b) by 44 days.

(21) Appl. No.: 13/106,153

(22) Filed: May 12, 2011

(65) Prior Publication Data

US 2012/0216241 A1 Aug. 23, 2012

Related U.S. Application Data

(60) Provisional application No. 61/445,089, filed on Feb. 22, 2011.

(51) Int. Cl.
*H04L 29/06* (2006.01)

(52) U.S. Cl.
CPC .................................. *H04L 63/20* (2013.01)

(58) Field of Classification Search
CPC ...................................................... H04L 63/08
USPC ............................................................ 726/1
See application file for complete search history.

(56) References Cited

U.S. PATENT DOCUMENTS

| | | | |
|---|---|---|---|
| 7,594,268 B1* | 9/2009 | Sobel ................. | H04L 63/1458 709/224 |
| 2005/0120160 A1* | 6/2005 | Plouffe .............. | G06F 9/45537 711/1 |
| 2006/0075478 A1* | 4/2006 | Hyndman .......... | H04L 63/0218 726/11 |
| 2006/0122955 A1* | 6/2006 | Bethlehem ........ | H04L 63/102 |
| 2006/0168260 A1* | 7/2006 | Hinde et al. ....... | 709/229 |
| 2007/0044155 A1* | 2/2007 | Pletka ................ | H04L 63/08 726/25 |
| 2007/0162861 A1* | 7/2007 | Friedlander ....... | G06F 21/83 715/741 |
| 2007/0234428 A1* | 10/2007 | Rash .................. | G06F 21/552 726/25 |
| 2010/0235481 A1* | 9/2010 | Deutsch ............. | H04L 29/12367 709/222 |

* cited by examiner

*Primary Examiner* — Harris C Wang
(74) *Attorney, Agent, or Firm* — M&B IP Analysts, LLC

(57) ABSTRACT

Disclosed are methods, circuits, apparatus, systems and associated software applications for providing security on one or more servers, including virtual servers. A server operating system may include or be otherwise functionally associated with a firewall application, which firewall application may regulate IP port access to resources on the server. A port-tending agent or application (PorTender) running on the server, or on a functionally associated computing platform, may monitor and regulate server port status (e.g. opened, closed, and conditionally opened). The PorTender may initiate and engage in communication sessions with a policy server, from which policy server the PorTender may receive port, user and security policies and/or settings.

20 Claims, 6 Drawing Sheets

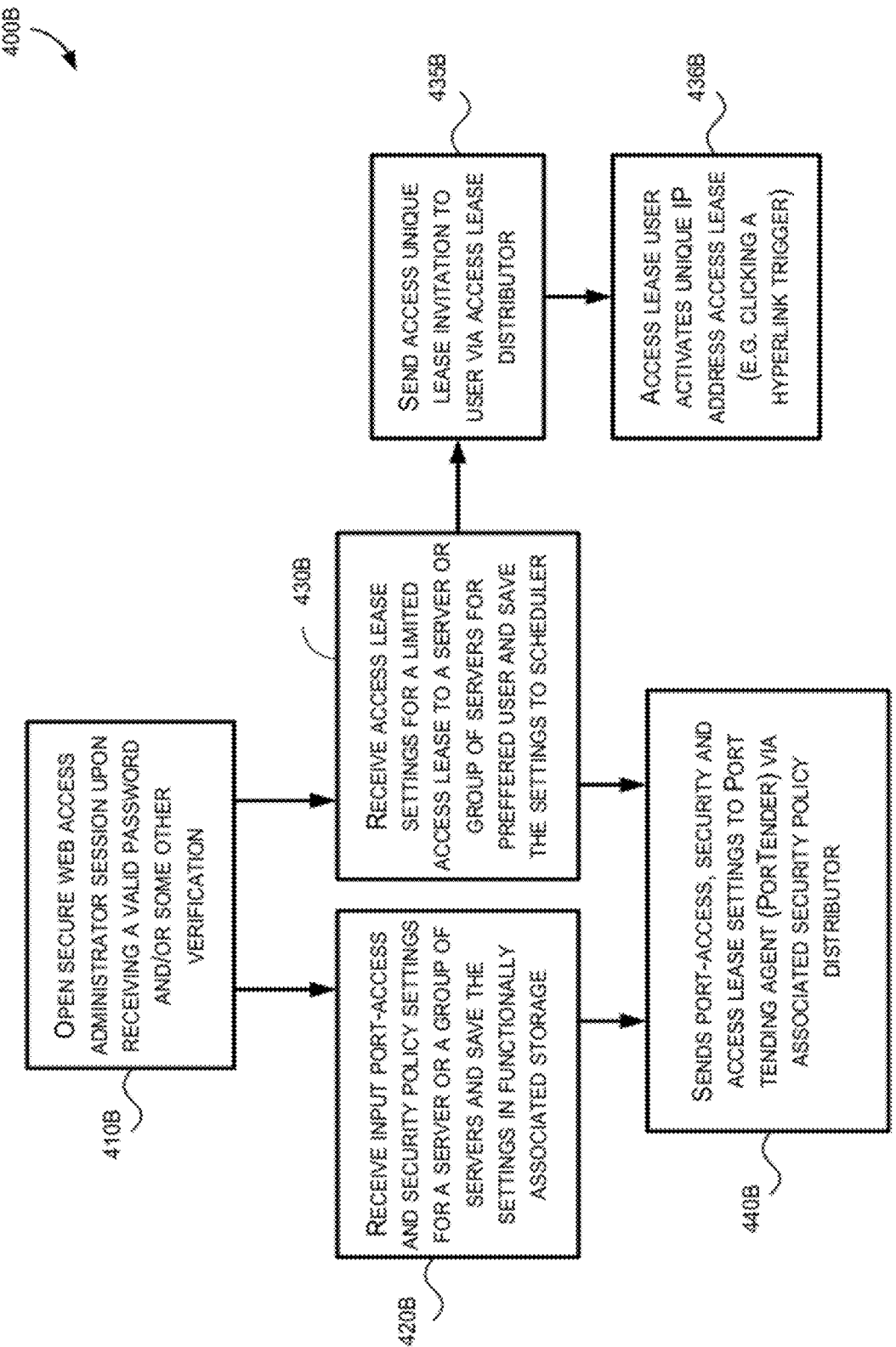

METHODS, CIRCUITS, APPARATUS, SYSTEMS AND ASSOCIATED SOFTWARE APPLICATIONS FOR PROVIDING SECURITY ON ONE OR MORE SERVERS, INCLUDING VIRTUAL SERVERS

FIELD OF THE INVENTION

Some embodiments relate generally to the field of computer network security and, more particularly, to methods, circuits, apparatus, systems and associated software applications for providing security on one or more servers, including virtual servers.

BACKGROUND

Computer networks, run by a server or a group of servers, are being used to manage the data for homes and businesses of all types and sizes. A computer network enables the sharing of files and printer resources, enabling easier communication between computers. Productivity is increased with a computer network due to the ease of syncing email, calendars and tasks enabling easier collaboration between employees and personnel. Large data storage systems attached to computer servers are used to backup and protect important data for the entire network.

A feature of computer networks that is becoming more widespread is remote on-demand access to the resources of the network. With the Internet becoming increasingly popular, more network users are able to connect to a remote server through any device with an internet connection. Users are able to connect to networks from home computers, laptops, tablets, smart phones, e-book readers, and any other mobile Internet device.

A computer network open to internet traffic can be a great safety risk. A connection through the internet can come from anyone and from anywhere in the world. Security systems, including firewalls, are needed to protect such a vulnerable connection. A firewall can filter incoming Internet data packets though its system, analyze the data and determine whether the data is secure and from a trustworthy source. A firewall can behave like a proxy server to forward received data while masking the network information of the attached computer network.

A typical computer network server firewall includes an administrator account for controlling the policies and settings of the server. The administrator account is accessed using some login method. Generally, this login method includes inputting to the server a typically straightforward administrator user name (e.g. Administrator or Admin) and some password. Since the password of the administrator account is the only level of security in place to protecting full access to the server, the security of the server is only as good as the administrator password.

There is thus a need in the field of computer network security for improved methods, circuits, apparatus, systems and associated software applications for providing security on one or more servers, including virtual servers.

SUMMARY OF THE INVENTION

The present invention includes methods, circuits, apparatus, systems and associated software applications for providing security on one or more servers, including virtual servers. According to some embodiments, a server operating system may include or be otherwise functionally associated with a firewall application, which firewall application may regulate IP port access to resources on the server. A port-tending agent or application (PorTender) running on the server, or on a functionally associated computing platform, may monitor and regulate server port status (e.g. opened, closed, and conditionally opened). According to further embodiments, the PorTender may initiate and engage in communication sessions with a policy server, from which policy server the PorTender may receive port, user and security policies and/or settings.

According to some embodiments of the present invention, the policy server may have a means for storing policy definitions and/or settings (i.e. standard and user defined). According to further embodiments of the present invention, the policy server may manage a group policy for a group of servers. The policy server may simultaneously manage a separate policy for each server in a group of servers. According to further embodiments of the present invention, the policy server (and associated PorTender) may support multiple server operating systems (e.g. Microsoft, Linux, etc.).

According to some embodiments of the present invention, the policy server may comprise a user interface with controls for security and/or connectivity policy settings adjustment or modification. The user interface may further comprise a multifactor authentication of trusted users (e.g. user password input, IP address, digital signature and/or digital certificate) and may utilize a secure communication protocol (e.g. SSH, SSL, TLS, etc.) with the trusted user machine.

According to some embodiments of the present invention, the policy server may provide controls for circumventing security policy including a secure access lease e.g. start time, IP address of the user and lease duration for accessing one or more ports. The policy server may include a scheduler for terminating a secure access lease automatically at the end of the lease duration.

According to some embodiments of the present invention, an administrator of the policy server may circumvent the security policy by granting an on-the-fly access to a temporary/provisional user. Access may be granted to the temporary/provisional user without prior knowledge of the user's IP address. Granting on-the-fly access may include generating an on-the-fly access lease and forwarding a trigger/invitation link for the lease by email (optionally secured by PGP, a pre-shared secret code, etc.) and/or optionally secured SMS. According to further embodiments of the present invention, the policy server may trigger and/or signal an associated PorTender to terminate a lease in real-time.

According to some embodiments, the PorTender may check for a new policy on some periodic checking schedule. The checking schedule may be set by the PorTender or by the policy server. The periodic checking (i.e. polling) may allow for the PorTender to operate while all incoming ports of the computing platform remain closed. According to further embodiments of the present invention, the PorTender may check for a new policy on a manual or one-time basis.

According to some embodiments, the policy server may signal the PorTender to initiate a communication session, for example by knocking on one or more ports, possibly by knocking according to a pre-agreed sequence of ports and timing. According to further embodiments of the present invention, when a communication session has been initiated, the PorTender may check the policy server for a new policy.

According to some embodiments of the present invention, the policy server may maintain an open connection with the PorTender, for example using a real-time communication protocol and/or service (e.g. Extensible messaging and presence protocol—XMPP). According to further embodiments of the present invention, a push technology (e.g. comet, Ajax push, HTTP streaming, etc.) may be implemented for the policy server to update the PorTender for a new policy.

According to some embodiments, the PorTender may have an emergency policy, which emergency policy may be activated if there are connectivity issues or a denial of service. According to further embodiments of the present invention, an Emergency Policy may be a pre-defined/pre-configured policy that allows some limited access to the PorTender by the Policy server. The Emergency Policy may be activated by the PorTender upon failure in communicating with the Policy server for a preconfigured period of time.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4B shows a flowchart including the steps performed by the policy server, according to some embodiments of the present invention.

Figure 1:
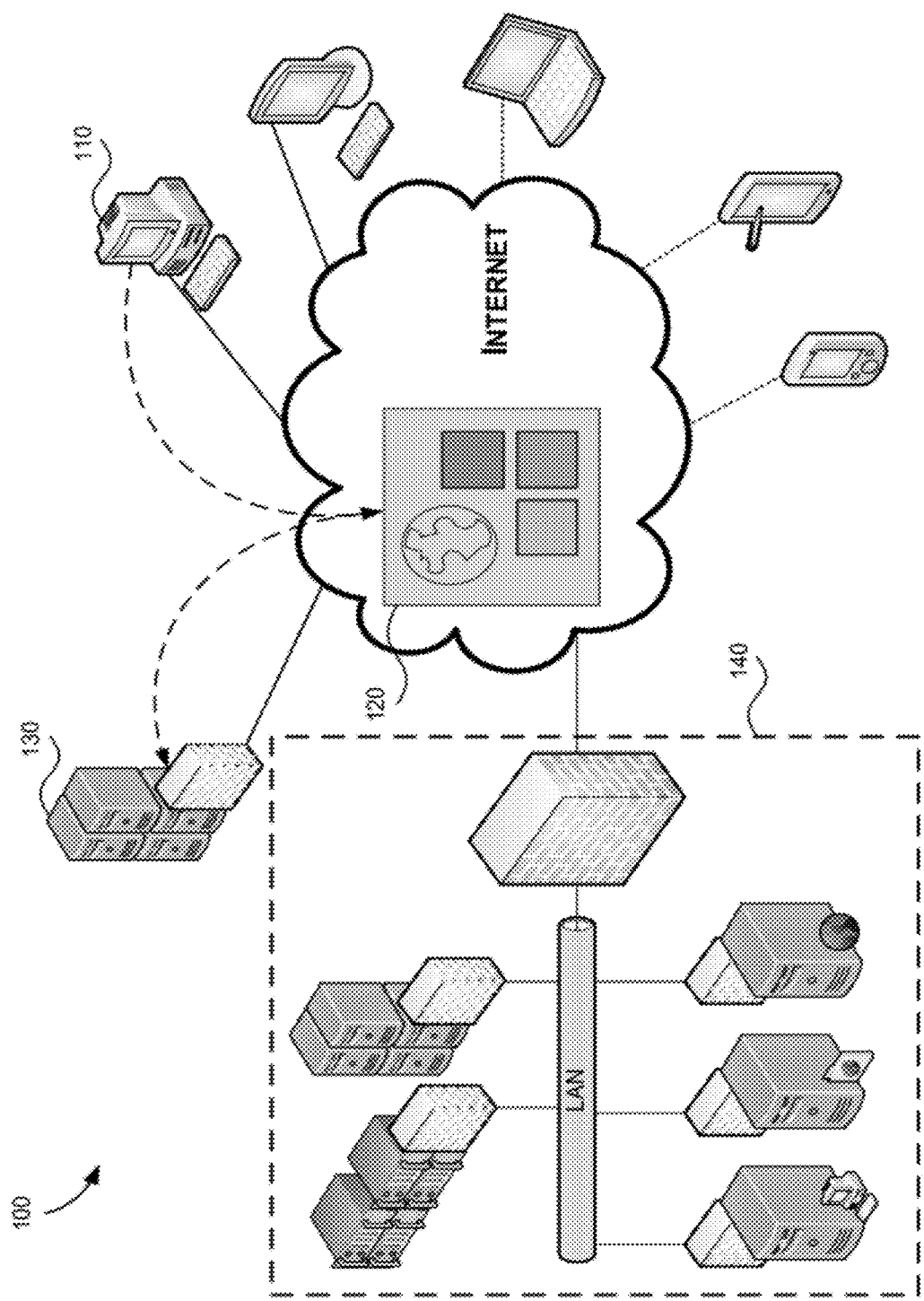
FIG. 1 shows a general system level diagram showing all constituent computer network elements (including the firewalls in the server OS) as well as a basic communication flow from a remote administrator access to a computing platform firewall, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, portable media players, cell phones, mobile devices, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories.

According to some embodiments of the present invention, there may be a policy server adapted to secure a functionally associated computing platform. According to further embodiments of the present invention, the policy server may comprise a direct secured tunnel administrator access to the computing platform, a configuration manager adapted to manage security settings and forward the settings along the tunnel, a secure internet-based graphical user interface (GUI) including security controls adapted to control the configuration manager, a dynamic access lease manager including security controls adapted to generate an on-the-fly access lease to the computing platform, and a secure internet-based GUI including security controls adapted to control the dynamic access lease manager. According to further embodiments of the present invention, the dynamic access lease manager may be further adapted to terminate the on-the-fly access lease. According to further embodiments of the present invention, the dynamic access lease manager may be further adapted to terminate the on-the-fly access lease according to a schedule.

According to some embodiments of the present invention, the tunnel may connect to a port-tending agent (PorTender) adapted to monitor and regulate port access to resources of the computing platform. The policy server may be further adapted to transmit administrator settings for port access to the PorTender. According to further embodiments of the present invention, transmitting administrator settings for port access may occur periodically according to a predetermined schedule. According to further embodiments of the present invention, transmitting administrator settings for port access may occur after a one-time request from the PorTender.

According to some embodiments of the present invention, there may be a port-tending agent (PorTender) adapted to monitor and regulate port access to resources of a functionally associated or integral computing platform. The PorTender may be further adapted to receive administrator settings for port access from a functionally associated policy server. According to further embodiments of the present invention, receiving administrator settings for port access may occur periodically according to a predetermined schedule. According to further embodiments of the present invention, receiving administrator settings for port access may occur after a one-time request of the policy server.

According to some embodiments of the present invention, the PorTender may be further adapted to simultaneously monitor and regulate a group of computing platforms connected to a network According to further embodiments of the present invention, the PorTender may be further adapted to be installed into an operating system of the computing platform.

According to some embodiments of the present invention, there may be a system for providing security on a computing platform comprising: a port-tending agent (PorTender) adapted to monitor and regulate port access to resources on the computing platform; a policy server functionally associated with the PorTender, wherein the policy server is adapted to control port access security and connectivity settings; a dynamic access lease manager associated with the policy server, wherein the dynamic access lease manager is adapted to generate an on-the-fly access lease to the computing platform; and a secure internet-based policy server user interface including controls adapted to adjust the policy server remotely.

According to some embodiments of the present invention, the dynamic access lease manager may be further adapted to terminate the on-the-fly access lease. According to further embodiments of the present invention, the dynamic access lease manager may be further adapted to terminate the on-the-fly access lease according to a schedule.

According to some embodiments of the present invention, the policy server may be further adapted to transmit administrator settings for port access to the PorTender. According to further embodiments of the present invention, receiving administrator settings for port access may occur periodically according to a predetermined schedule. According to further embodiments of the present invention, receiving administrator settings for port access may occurs after a one-time request from the PorTender.

According to some embodiments of the present invention, the PorTender may be further adapted to be installed into an operating system of the computing platform.

Figure 2:
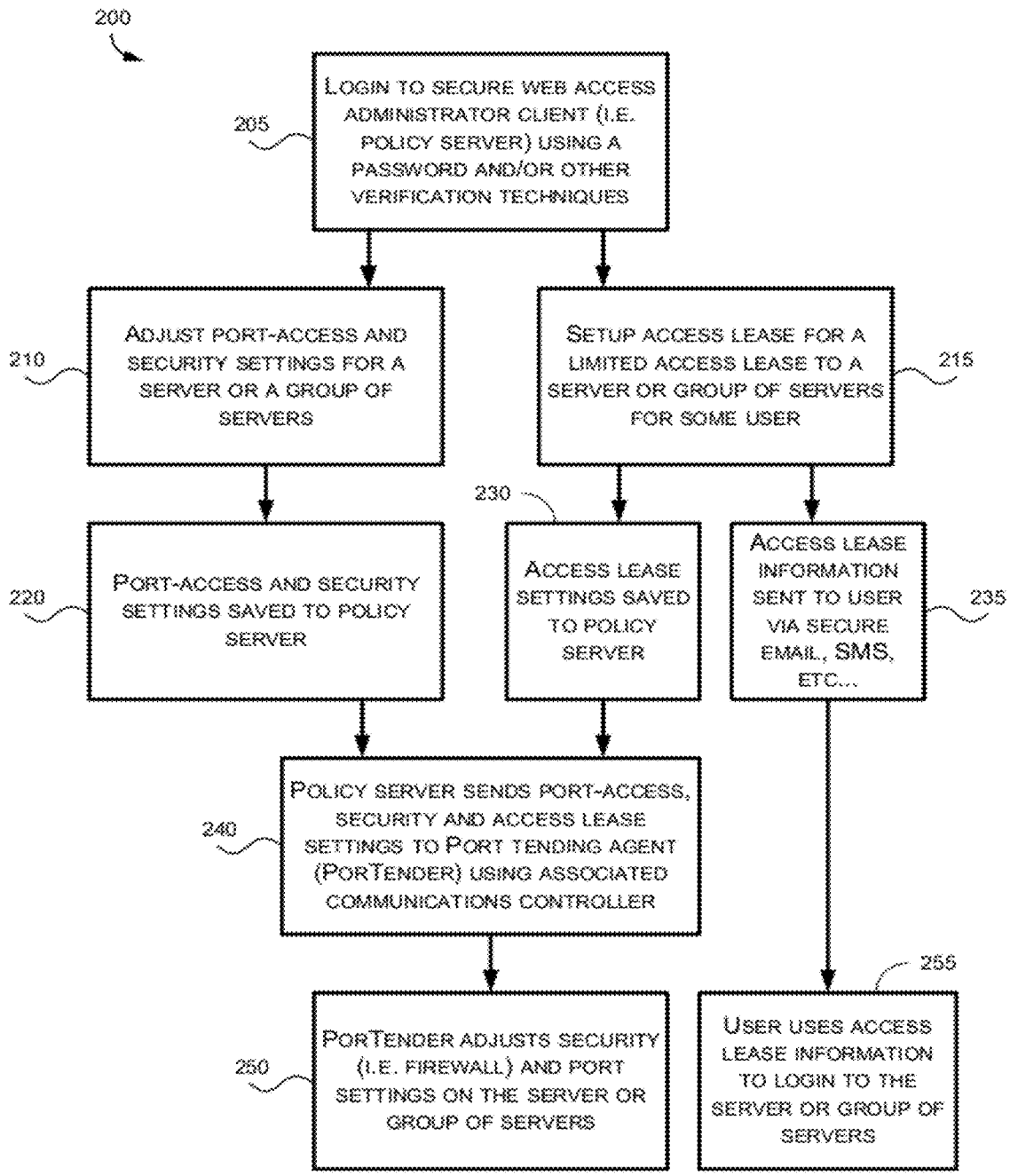
FIG. 2 is a flow chart including the steps of a basic communication flow from a remote administrator access to a computing platform firewall, according to some embodiments of the present invention.

Now turning to FIG. 1, there is shown a general system level diagram (100) showing all constituent computer network elements (including the firewalls in the server OS) as well as a basic communication flow from a remote administrator access to a computing platform firewall, according to some embodiments of the present invention. System 100 may be described in view of FIG. 2 showing a flow chart (200) including the steps of a basic communication flow from a remote administrator access to a computing platform firewall, according to some embodiments of the present invention.

According to some embodiments of the present invention, system 100 may comprise a device for user Internet access (e.g. client machine 110) which may be any device from the group consisting of: computer terminal, desktop computer, laptop computer, nettop, netbook, tablet, mobile internet device, smartphone etc. System 100 may further comprise a secure web access administrator client (i.e. cloud service 120), providing a front-end for a policy server. System 100 may further comprise a secure server (130) and/or a group of secure servers (140) accessible from cloud service 120 and adapted with a port tending agent (PorTender).

According to some embodiments of the present invention, an administrator may login (205) to secure web access administrator client 120 (i.e. policy server) using a password and/or any other predetermined verification technique. According to further embodiments of the present invention, the administrator may adjust (210) port-access and security settings for secure server 130 and/or group of secure servers 140. The adjusted settings may be saved (220) to the policy server.

According to some embodiments of the present invention, the administrator may setup (215) an access lease for a limited access lease to secure server 130 and/or group of secure servers 140. The access lease settings may be saved (230) to the policy server. According to further embodiments of the present invention, the access lease information may be sent to a preferred user via an optional combination of secure email, SMS, and/or any other direct or otherwise secure messaging system.

According to some embodiments of the present invention, the policy server may send (240) port-access, security and access lease settings to Port tending agent (PorTender) using integral or functionally associated communications controller. According to further embodiments of the present invention, the PorTender may adjust (250) security and port settings on secure server 130 and/or group of secure servers 140. The preferred user may then use received access lease information to login and access secure server 130 and/or group of secure servers 140.

Figure 3A:
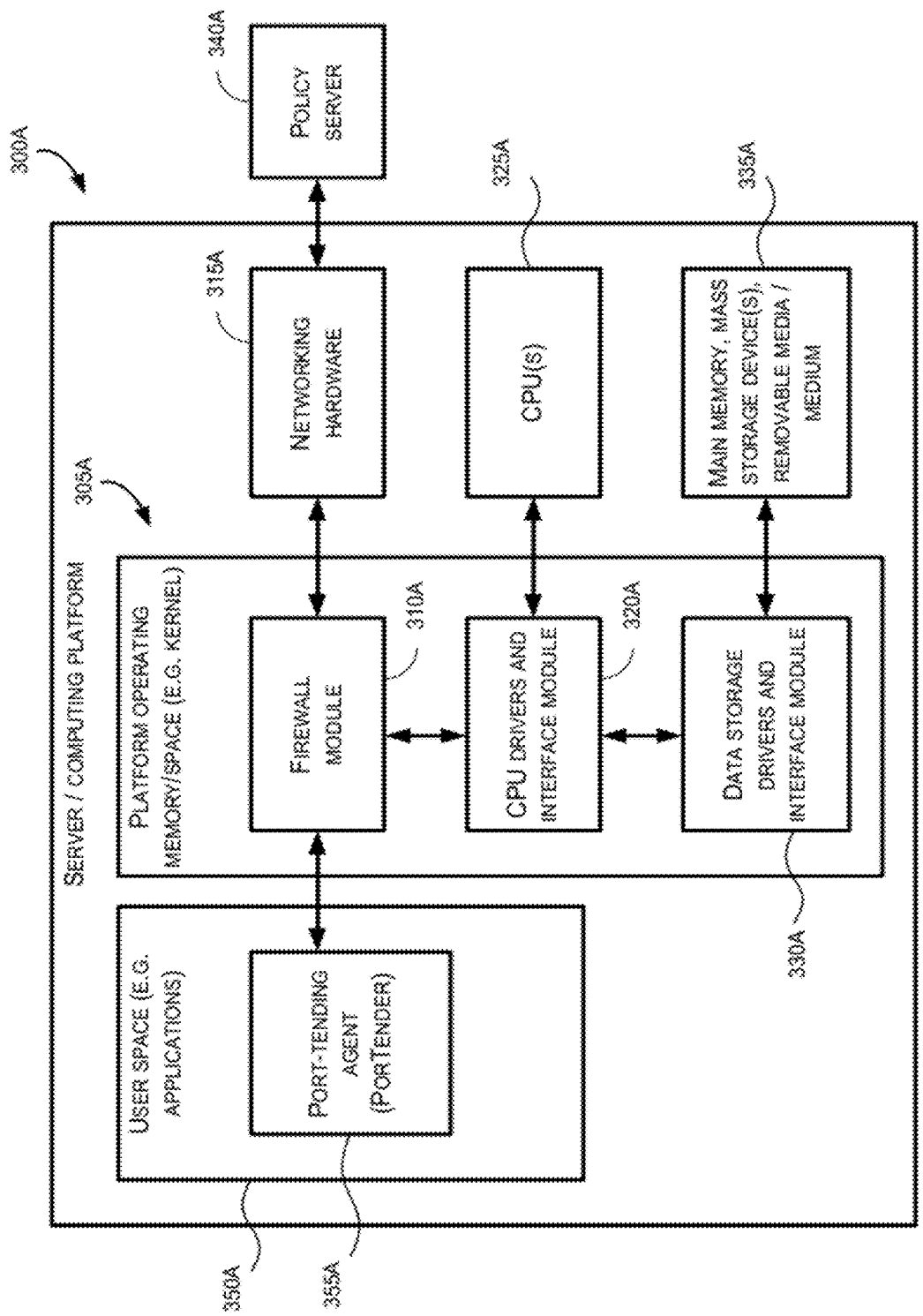
FIG. 3A shows a functional level diagram of PorTender inside of a Server/computing platform, according to some embodiments of the present invention.
Figure 3B:
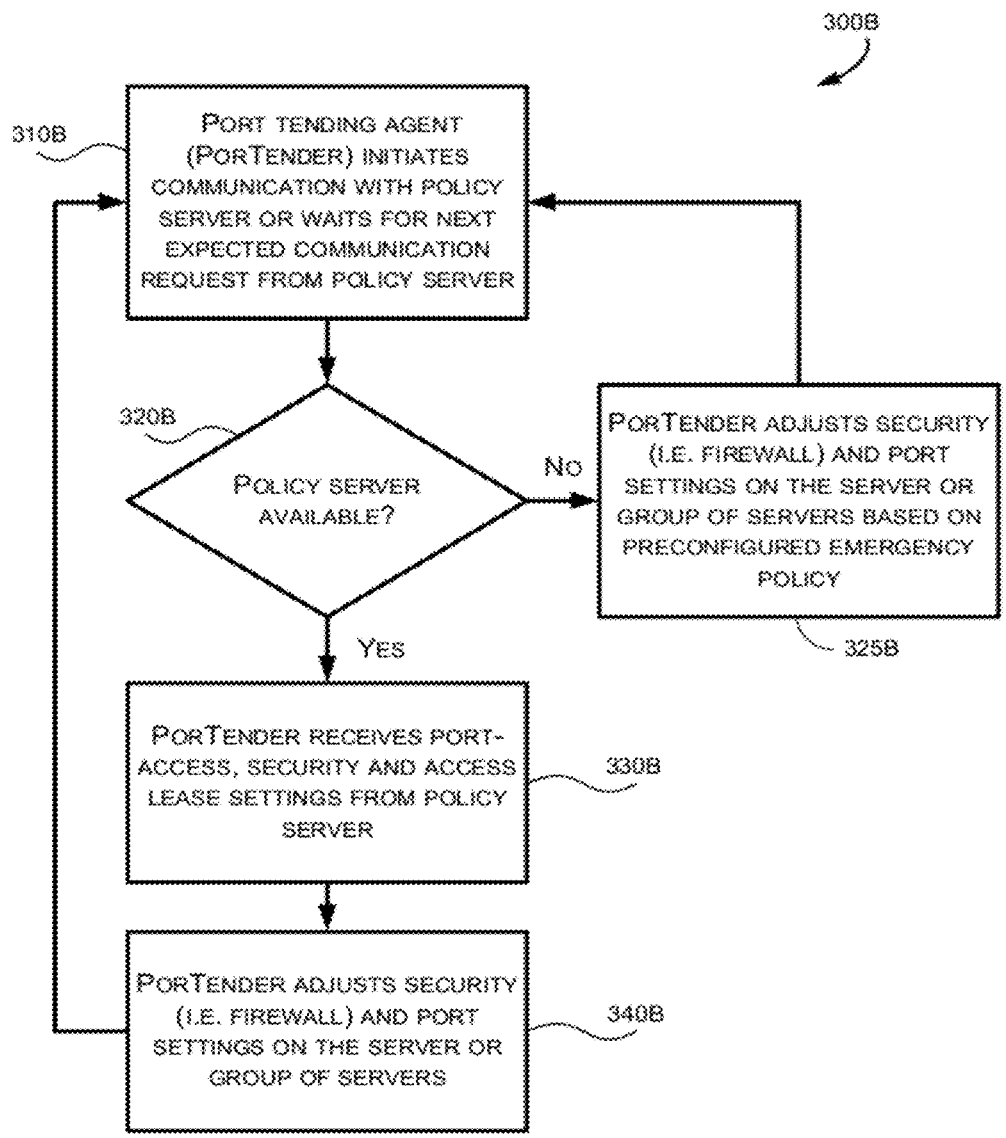
FIG. 3B shows a flowchart including the steps performed by the PorTender, according to some embodiments of the present invention.

Now turning to FIG. 3A, there is shown a functional level diagram (300A) of PorTender inside of a Server/computing platform, according to some embodiments of the present invention. System 300A may be described in view of FIG. 3B, showing a flowchart (300B) including the steps performed by the PorTender, according to some embodiments of the present invention.

According to some embodiments of the present invention, a server or any computing platform (300A) may comprise some processing logic, circuit, device, system and/or associated software for executing processing functions for the sever (e.g. Platform operating memory/space 305A). Platform operating memory/space (e.g. kernel) 305A may comprise firewall module 310A, adapted to control and secure functionally associated networking hardware 315A integral to or functionally associated with server 300A. Platform operating memory/space (e.g. kernel) 305A may further comprise Data storage drivers and interface module 330A, adapted to control functionally associated storage devices (e.g. main memory, mass storage device(s), removable media/medium 335A) integral to or functionally associated with server 300A. Platform operating memory/space (e.g. kernel) 305A may further comprise CPU drivers and interface module (320A), adapted to control functionally associated CPU(s) 325A functionally associated with or integral to server 300A.

According to some embodiments of the present invention, server/computing platform 300A may be adapted to communicate to a network (e.g. LAN, WAN, VPN, etc.) via functionally associated networking hardware 315A integral to or functionally associated with server 300A. Platform operating memory/space (e.g. kernel) 305A may include firewall 310A to control server/computing platform 300A port access.

According to some embodiments of the present invention, server/computing platform 300A may include user space 350A for running integral or functionally associated applications. User space 350A may further include a port-tending agent (PorTender 355A) adapted to provide direct access to firewall module 310A and control security and/or port access settings. PorTender 355A may communicate with functionally associated policy server 340A, through firewall module 310A and via networking hardware 315A, to receive updated security policy and/or port access settings.

According to some embodiments of the present invention, PorTender 355A may initiate (310B) a secure communication session with policy server 340A or may wait for a next expected communication request from policy server 340A. The connection between PorTender 355A and policy server 340A may be a substantially real-time open connection. According to further embodiments of the present invention when policy server 340A is unavailable (320B), PorTender 355A may adjust (325B) security settings of firewall 310A and port settings of server 300A based on a preconfigured emergency policy. A preconfigured emergency mode timeout setting may determine the length of unavailability that triggers the emergency policy.

According to some embodiments of the present invention when policy server 340A is available (320B), PorTender 355A may receive (330B) port-access, security and access lease settings from policy server 340A. According to further embodiments of the present invention, PorTender 355A may adjust (340B) security settings of firewall 310A and port settings of server 300A based on the received policy.

Figure 4A:
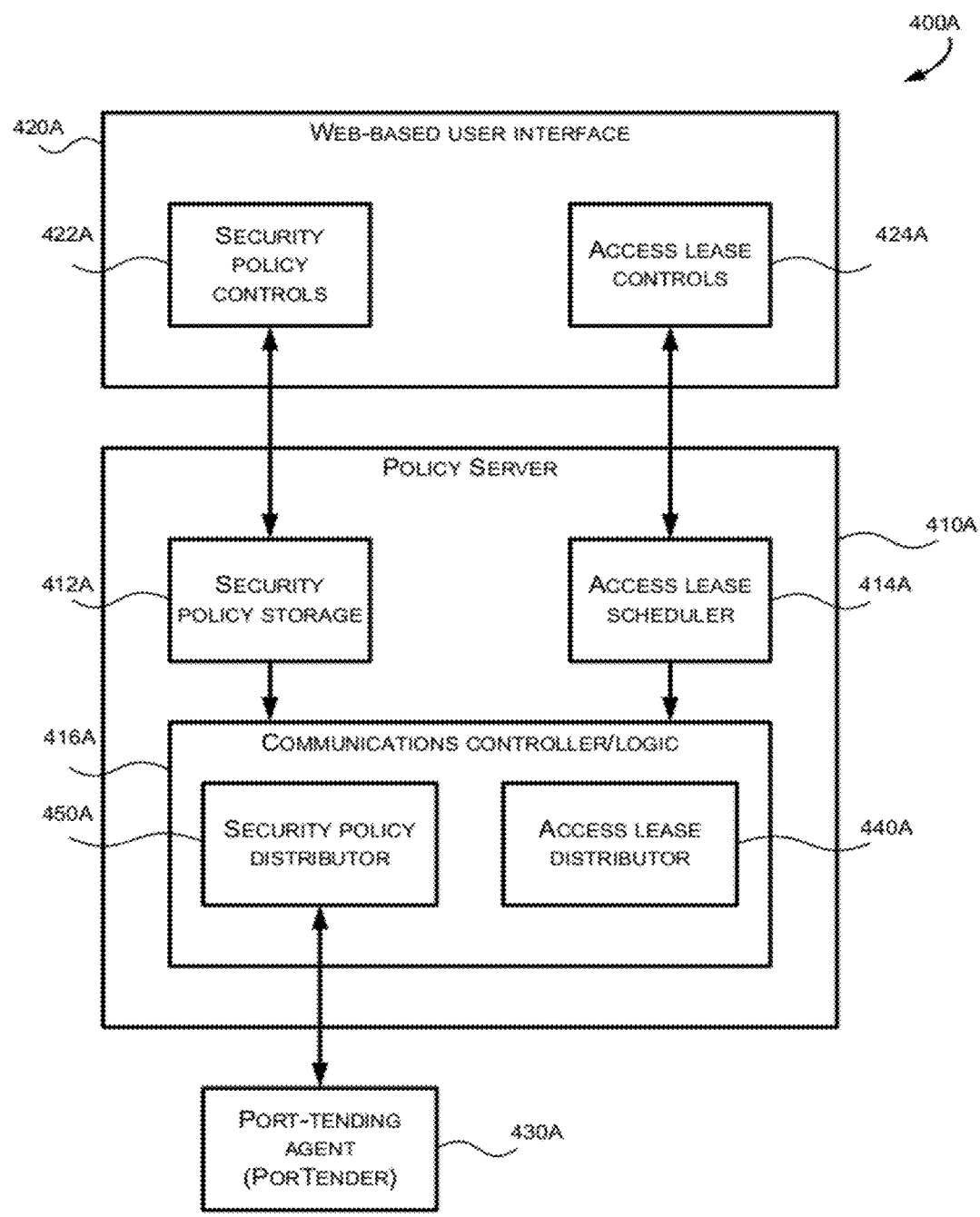
FIG. 4A shows a functional level diagram of a policy server, according to some embodiments of the present invention.

Now turning to FIG. 4A, there is shown a functional level diagram (400A) of a policy server, according to some embodiments of the present invention. System 400A may be described in view of FIG. 4B, showing a flowchart (400B) including the steps performed by the policy server, according to some embodiments of the present invention.

According to some embodiments of the present invention, web-based user interface 420A (i.e. a cloud service) may provide security policy controls 422A and access lease controls (424A) for functionally associated policy server 410A. Policy server 410A may comprise security policy storage 412A and access lease scheduler 414A. According to some embodiments of the present invention, policy server 410A may further comprise communications controller/logic 416A to transmit and receive information with security policy distributor 450A and access lease distributor 440A.

According to some embodiments of the present invention, policy server 410A may open (410B) a secure web access administrator session upon receiving a valid password and/or some other verification (e.g. IP address). According to further embodiments of the present invention, policy server may receive (430B) access lease settings for a limited access lease to a server or group of servers for a preferred user and save the settings to access lease scheduler 414A. According to further embodiments of the present invention, the access lease information (i.e. a unique IP address invitation) may be sent (435B) to the preferred user via access lease distributor 440A. The preferred access lease user may activate (436B) the unique access IP address access lease (e.g. by clicking a hyperlink trigger).

According to some embodiments of the present invention, policy server 410A may receive (420B) input port-access and security policy settings for a server or group of servers and save the settings in security policy storage 412A. According to further embodiments of the present invention, security policy distributor 450A may communicate with Port Tending agent (PorTender—430A) using a scheduled communication module, protocol and/or service (e.g. a polling module and/or a port-knocking module). According to further embodiments of the present invention, security policy distributor 450A may communicate with PorTender—430A using a substantially real-time communication module, protocol and/or service (e.g. a push module and/or Extensible messaging and presence protocol—XMPP). Policy server 410A may send (440B) port-access, security and access lease settings to PorTender 430A via security policy distributor (450A).

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can comprise, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A policy server configured to secure a functionally associated computing platform comprising:
   a memory; and
   one or more processor in communication with the memory;
   the memory is configured to store computer executable instructions that when executed by the one or more processor, cause the one or more processor to provide:
   a direct secured tunnel administrator configured to establish a secure tunnel communication with said computing platform responsive to an intermittent connection request from said computing platform;
   a configuration manager configured to manage security settings and forward the settings along said tunnel;
   a secure internet-based graphical user interface (GUI) including security controls configured to control said configuration manager;
   a dynamic access lease manager including security controls configured-to generate an on-the-fly access lease to said computing platform, wherein the on-the-fly access lease defines provisions for accessing one or more firewall ports of said computing platform, wherein said provisions includes at least a lease duration for accessing one or more ports;
   a secure internet-based GUI including security controls configured to control said dynamic access lease manager; and
   control logic to coordinate activity between constituents of said policy server such that access to resources of said computing platform through an opening of said one or more firewall ports of said computing platform is triggered by the passing of an instruction from either said configuration manager or said dynamic access lease manager to the computing platform during a secure tunnel communication requested by said computing platform, wherein the access to resources of said computing platform is determined based on the generated on-the-fly access lease and the security settings.

2. The policy server according to claim 1, wherein said dynamic access lease manager is configured to terminate the on-the-fly access lease.

3. The policy server according to claim 2, wherein said dynamic access lease manager is further configured to terminate the on-the-fly access lease according to a schedule.

4. The policy server according to claim 1, wherein said tunnel connects to a port-tending agent (PorTender) configured to monitor and regulate the port access to the resources of said computing platform.

5. The policy server according to claim 4, further configured to transmit administrator settings for port access to said PorTender.

6. The policy server according to claim 5, wherein transmitting administrator settings for port access occurs periodically according to a predetermined schedule.

7. The policy server according to claim 5, wherein transmitting administrator settings for port access occurs after a one-time request from said PorTender.

8. A system for providing security on a computing platform comprising:
   a memory; and
   one or more processor in communication with the memory;
   the memory is configured to store computer executable instructions that when executed by the one or more processor, cause the one or more processor to provide:
   a port-tending agent (PorTender) configured to monitor and regulate port access to resources on the computing platform and to intermittently trigger a secure tunnel communication with a policy server functionally associated with said PorTender, wherein said policy server is configured to control port access security and connectivity settings;
   a dynamic access lease manager associated with said policy server, wherein said dynamic access lease manager is configured to generate an on-the-fly access lease to said computing platform, wherein the on-the-fly access lease defines provisions for accessing one or more firewall ports of said computing platform, wherein said provisions includes at least a lease duration for accessing one or more ports;
   a secure internet-based policy server user interface including controls configured to adjust said policy server remotely; and
   wherein said PorTender is configured to open one or more firewall ports of said computing platforms upon receiving instruction from said policy server during a secure tunnel communication with said policy server, wherein secure tunnel communication is intermittently triggered by said PorTender, and wherein the one or more firewall ports are opened respective of the generated on-the-fly access lease and the security settings.

9. The system according to claim 8, wherein said dynamic access lease manager is further configured to terminate the on-the-fly access lease.

10. The system according to claim 9, wherein said dynamic access lease manager is further configured to terminate the on-the-fly access lease according to a schedule.

11. The system according to claim 8, wherein said policy server is further configured to transmit administrator settings for port access to said PorTender.

12. The system according to claim 11, wherein receiving administrator settings for port access occurs periodically according to a predetermined schedule.

13. The system according to claim 11, wherein receiving administrator settings for port access occurs after a one-time request from said PorTender.

14. The system according to claim 8, wherein said PorTender is further configured to be installed into an operating system of the computing platform.

15. A method for providing security on a computing platform comprising:
   establishing a secure tunnel communication with said computing platform responsive to an intermittent connection request from said computing platform;
   managing security settings and forwarding the settings along said tunnel;
   generating an on-the-fly access lease to said computing platform, wherein the on-the-fly access lease defines provisions for accessing one or more firewall ports of said computing platform, wherein said provisions includes at least a lease duration for accessing one or more ports; and
   controlling access to resources of said computing platform through an opening of one or more firewall ports of said computing platform, wherein the access to resources of said computing platform is determined based on the generated on-the-fly access lease and the security settings, and is triggered by passing an instruction to the computing platform during a secure tunnel communication requested by said computing platform.

16. The method according to claim 15, further comprising terminating the on-the-fly access lease according to a schedule.

17. The method according to claim 15, further comprising: monitoring and regulating the port access to the resources of said computing platform by a port-tending agent (PorTender) connected to the tunnel.

18. The method according to claim 17, further comprising transmit administrator settings for port access to the PorTender.

19. The method according to claim 18, wherein transmitting administrator settings for port access occurs periodically according to a predetermined schedule.

20. The method according to claim 19, wherein transmitting administrator settings for port access occurs after a one-time request from said PorTender.

* * * * *